(12) United States Patent
Tanaka

(10) Patent No.: US 9,827,751 B2
(45) Date of Patent: Nov. 28, 2017

(54) ROTATIONALLY DRIVING MECHANISM AND FILM LABEL ATTACHING APPARATUS USING THE MECHANISM

(71) Applicant: TOYO SEIKAN GROUP HOLDINGS, LTD., Tokyo (JP)

(72) Inventor: Hiroki Tanaka, Yokohama (JP)

(73) Assignee: TOYO SEIKAN GROUP HOLDINGS, LTD., Tokyo (JP)

(*) Notice: Subject to any disclaimer, the term of this patent is extended or adjusted under 35 U.S.C. 154(b) by 301 days.

(21) Appl. No.: 14/431,527

(22) PCT Filed: Oct. 16, 2013

(86) PCT No.: PCT/JP2013/078094
§ 371 (c)(1),
(2) Date: Mar. 26, 2015

(87) PCT Pub. No.: WO2014/097726
PCT Pub. Date: Jun. 26, 2014

(65) Prior Publication Data
US 2015/0258758 A1 Sep. 17, 2015

(30) Foreign Application Priority Data
Dec. 17, 2012 (JP) ................. 2012-274768

(51) Int. Cl.
*H02K 51/00* (2006.01)
*B32B 37/00* (2006.01)
(Continued)

(52) U.S. Cl.
CPC ............ *B32B 37/0046* (2013.01); *B65C 9/04* (2013.01); *H02K 49/102* (2013.01); *H02K 51/00* (2013.01); *Y10T 156/1702* (2015.01)

(58) Field of Classification Search
CPC ...................................................... H02K 51/00
(Continued)

(56) References Cited

U.S. PATENT DOCUMENTS

2006/0091748 A1 5/2006 Yoda et al.

FOREIGN PATENT DOCUMENTS

DE 1252788 B 10/1967
DE 3137201 A1 3/1983
(Continued)

OTHER PUBLICATIONS

Machine translation of German Patent DE 1252788, date unknown.*
(Continued)

*Primary Examiner* — Jeff Aftergut
(74) *Attorney, Agent, or Firm* — Westerman, Hattori, Daniels & Adrian, LLP

(57) ABSTRACT

An object of the present invention is to provide a rotationally driving mechanism that is capable of rotating a plurality of rotational shafts while continuously moving the rotational shafts without requiring a special driving device or control device, and is capable of appropriately changing a rotation speed with a simple configuration, and to provide a film label attaching apparatus.
The rotationally driving mechanism includes a movable driven member 103 that includes a driven mechanism 105 in a tapered portion 104 and is coupled to a rotational shaft 112, and a driving member 101 that is disposed along a movement direction of the driven member 103 and includes a transmission mechanism 102 in an inclined portion 115. The transmission mechanism 102 is disposed to face an appropriate position of the driven mechanism 105.

8 Claims, 8 Drawing Sheets

(51) Int. Cl.
*B65C 9/04* (2006.01)
*H02K 49/10* (2006.01)

(58) Field of Classification Search
USPC .......................................................... 156/538
See application file for complete search history.

(56) References Cited

FOREIGN PATENT DOCUMENTS

| | | | |
|---|---|---|---|
| DE | 3719973 A1 | | 12/1988 |
| JP | 2-75987 U | | 6/1990 |
| JP | 5-40708 Y | * | 10/1993 |
| JP | 11-208839 A | | 8/1999 |
| JP | 2001-179830 A | | 7/2001 |
| JP | 2005-354826 A | | 12/2005 |
| JP | 2006-129664 A | | 5/2006 |
| WO | 96/40559 A2 | | 12/1996 |

OTHER PUBLICATIONS

Machine translation of Japanese Patent JP 2001-179830, date unknown.*
Macine translation of Japanese Patent JP-5-40708, date unknown.*
Machine translation of German Patent DE 3719973, date unknown.*
Extended (supplementary) European Search Report dated Sep. 7, 2015, issued in counterpart European Patent Application No. 13864422.4. (6 pages).
International Search Report dated Jan. 7, 2014, issued in corresponding application No. PCT/JP2013/078094.

* cited by examiner

ROTATIONALLY DRIVING MECHANISM AND FILM LABEL ATTACHING APPARATUS USING THE MECHANISM

TECHNICAL FIELD

The present invention relates to a rotationally driving mechanism and a film label attaching apparatus using the mechanism.

BACKGROUND ART

In an example of a conventionally known film label attaching apparatus that attaches a film label on the outer circumferential surface of a can body, the can body is rotated while being moved in order to perform attaching of the film label, pre/post processing for the attaching, and the like.

Various rotationally driving mechanisms, which rotate can bodies while moving the can bodies, have also been known.

For example, a known film label attaching apparatus, which is disclosed in Japanese Patent Application Laid-open No. 2001-179830 (Patent Document 1) and the like, is configured such that a can body is supported by a mandrel 20 of a mandrel rotationally conveying unit 1 during the steps of attaching a film label to the can body, heating a can body as preprocessing, and cooling the can body as post processing, and the mandrel 20 rotates by coming into friction contact with a roller 21 and a guide surface 22 while moving on an endless track, which is substantially a revolution track, whereby the can body is rotated while being moved through the processing steps.

More specifically, the mandrel rotationally conveying unit 1 forms a rotationally driving mechanism including: the mandrel 20 that includes a rotational shaft and can move in a direction orthogonal to the rotational shaft; a fixed driving member (the guide surface 22) disposed along the movement direction of the mandrel 20; and a driven member (the roller 21) that faces the driving member and rotates while moving.

When a driving mechanism for the movement is provided, the known rotationally driving mechanism requires no special driving device or control device for the rotation. Thus, an extremely simple configuration can be achieved for an apparatus that rotates a large number of can bodies while continuously moving the can bodies and performs processing thereon, such as the known film label attaching apparatus described above.

PRIOR ART DOCUMENT

Patent Document

[Patent Document 1]
Japanese Patent Application Laid-open No. 2001-179830

DISCLOSURE OF THE INVENTION

Problem to be Solved by the Invention

In the known rotationally driving mechanism, the rotation speed of the rotational shaft is determined by the movement speed of the mandrel. Thus, the rotational shaft is either rotationally driven or not, depending on the presence and absence of the fixed driving member, and the rotation speed cannot be autonomously changed.

This raises a problem in the known film label attaching apparatus.

For example, to perform processing for achieving higher adherence of the film label, which has been attached on, by re-pressing the can body with a fixed pressing pad and the like, the can body has to roll on the pressing pad.

However, in the known film label attaching apparatus, employing the rotationally driving mechanism described above, the diameter of the driven member (the roller 21) is generally set to obtain the optimum rotation speed for the other processing and does not match the diameter of the can body. Accordingly, the rotation speed obtained by the driven member (the roller 21) and the rotation speed obtained when the can body rolls on the pressing pad do not match. Thus, force, applied to the can body in a circumferential direction, is produced due to the rotation speed difference at the moment when the can body comes into contact with the pressing pad. As a result, there is a problem in that friction causes surface damage and wrinkling of the film label.

The present invention is made to solve the problems described above, and an object of the present invention is to provide a rotationally driving mechanism that is capable of rotating a large number of rotational shafts while continuously moving the rotational shafts without requiring a special driving device or control device and is capable of changing the rotation speed as desired with a simple configuration, and to provide a film label attaching apparatus that is capable of appropriately changing the rotation speed while continuously moving a large number of can bodies and thus enabling optimum processing.

Means for Solving the Problem

A rotationally driving mechanism according to the present invention to solve the problem includes: a movable driven member that includes a driven mechanism in a tapered portion and is coupled to a rotational shaft; and a driving member that is disposed along a movement direction of the driven member and includes a transmission mechanism in an inclined portion. The transmission mechanism is disposed to face an appropriate position of the driven mechanism in a rotational shaft direction.

A film label attaching apparatus according to the present invention to solve the problem makes a plurality of can bodies continuously move while rotating and attaches film labels on outer circumferential surfaces of the plurality of can bodies. The can bodies are each continuously moved while being rotated by the rotational shaft of the driven member of the rotationally driving mechanism.

Effect of the Invention

A rotationally driving mechanism according to claim 1 includes: a movable driven member that includes a driven mechanism in a tapered portion and is coupled to a rotational shaft; and a driving member that is disposed along a movement direction of the driven member and includes a transmission mechanism in an inclined portion. The transmission mechanism is disposed to face an appropriate position of the driven mechanism in a rotational shaft direction. Thus, the rotation speed of the rotational shaft of the driven member can be appropriately selected, and can be continuously changed while the driven member (rotational shaft) is being rotationally driven With the configuration described above, the large number of rotational shafts can be rotated while being moved without requiring a special driving device or control device, and the rotation speed can be appropriately changed with a simple configuration.

In a configuration according to claim 2, the driven mechanism and the transmission mechanism face each other while being separated from each other. Thus, heat, noise, abrasion powder, and the like due to frictional contact are less likely to be produced, and need for part replacement can be eliminated without supplying lubricants, performing maintenance, or performing other like processing.

Thus, the configuration can be applied to various devices and apparatuses without adversely affecting accuracy, environment, cleanness, and the like.

Because the driving member and the driven member are not in contact with each other, the position where the transmission mechanism of the driving member faces the driven mechanism of the driven member in the direction of the rotational shaft can be continuously and rapidly changed, whereby the rotation speed can be more flexibly set and changed.

In a configuration according to claim 3, the driven mechanism is formed of a plurality of driven magnetic poles and the transmission mechanism is formed of a plurality of driving magnetic poles, and the driven magnetic poles are disposed at an equal angular pitch that continuously reduces from a large diameter side to a small diameter side, and a pitch of the driving magnetic poles is set to match the pitch of the driven magnetic poles at an appropriate position where the driving magnetic poles face the driven magnetic poles. Thus, the rotation can be surely accelerated and decelerated.

With a configuration according to claim 4, the rotation speed can be smoothly and surely be changed in a section where the rotation speed needs to be actively changed along the movement direction of the driven member (rotational shaft).

With a film label attaching apparatus according to claim 5, when a plurality of can bodies are continuously moved while being rotated, to be subjected to a plurality of steps including a step of attaching a film label and pre/post processing of the step, the rotation speed at a position of each step can be appropriately set and continuously changed so that optimum processing steps can be efficiently arranged, thereby improving productivity.

With a configuration according to claim 6, the rotation speed, in the label attaching section determined in accordance with a label winding speed, can be accurately changed by the rotationally driving mechanism right before the can body moves to the re-pressing section. Thus, the optimum rotation speed can be freely set in both sections.

Furthermore, the rotation speed can be swiftly and actively changed between both sections, whereby the sections can be arranged with a short distance therebetween. Thus, the film label attaching apparatus can have a small size as a whole and the productivity can be improved.

In a configuration according to claim 7, a pressing pad on which the can bodies contact and roll while moving in the re-pressing section is disposed on a side of the rotational shaft of the driven member where the driving member is disposed. Thus, the rotationally driving mechanism can swiftly achieve the rotation speed obtained by rolling on the pressing pad. Thus, the re-pressing can be performed efficiently without causing surface damage and wrinkling of the film label due to friction. Furthermore, the label attaching section and the re-pressing section can be arranged with a short distance therebetween, whereby the productivity can be improved.

In a configuration according to claim 8, the driving member is continuously disposed over all sections in the movement direction of the can bodies. Thus, the can bodies can be driven with the rotation speed changed to an optimum rotation speed in each step, whereby the productivity can be further improved.

EXPLANATION OF REFERENCE NUMERALS

Figure 1:
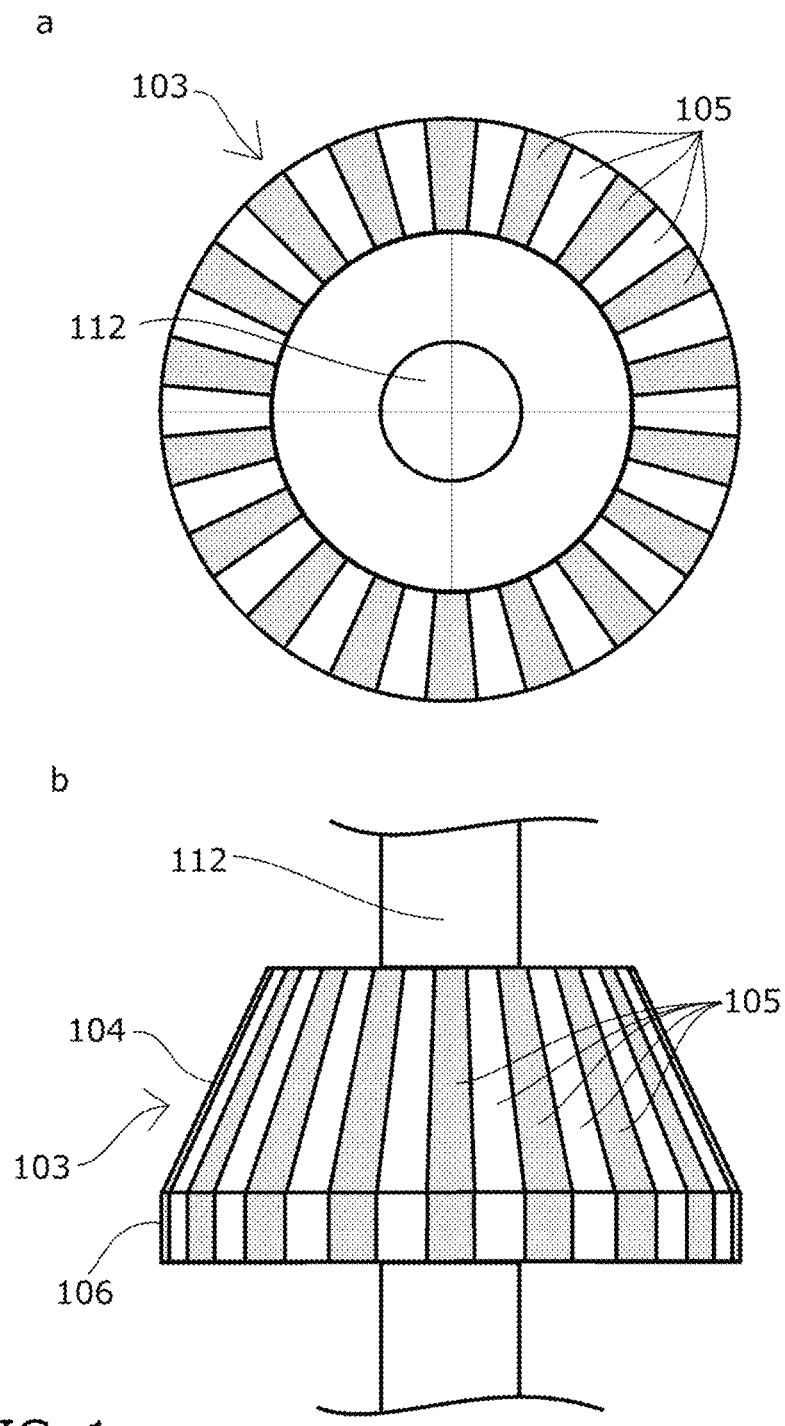
FIG. 1 includes plan and front views of a driven member of a rotationally driving mechanism according to an embodiment of the present invention.

100 . . . film label attaching apparatus
101 . . . driving member
102 . . . driving magnetic pole
103 . . . driven member
104 . . . tapered portion
105 . . . driven magnetic pole
106 . . . cylindrical portion
110 . . . main turret
112 . . . rotational shaft
113 . . . mandrel
114 . . . supporting portion
115 . . . inclined portion
116 . . . flat portion
121 . . . frame
122 . . . main shaft
123 . . . rotating body
124 . . . supporting plate
125 . . . supporting pin
126 . . . fitting hole
127 . . . cam follower
128 . . . cam groove
129 . . . pressing pad
150 . . . can body supplying wheel
160 . . . can body discharging wheel
170 . . . film label attaching roller
CA . . . can body
LP . . . label attaching section
KP . . . acceleration section
PP . . . re-pressing section
GP . . . deceleration section Mode for Carrying Out the Invention A rotationally driving mechanism according to the present invention includes: a movable driven member that includes a driven mechanism in a tapered portion and is coupled to a rotational shaft; and a driving mechanism that is disposed along a movement direction of the driven member and includes a transmission mechanism in an inclined portion. The transmission mechanism faces an appropriate position of the driven mechanism in a direction along the rotational shaft.

Any specific configuration may be employed as long as a large number of rotational shafts can be rotated while being moved continuously without requiring a special driving device or control device, and a rotation speed can be appropriately change with a simple configuration.

In a film label attaching apparatus of the present invention, a plurality of can bodies are rotated while being continuously moved and a film label is attached on outer circumferential surfaces of the can bodies, and the can body are rotated while being continuously moved by the rotational shaft of the rotationally driving mechanism of the present invention described above. Any specific configuration may be employed as long as optimum processing can be performed with the plurality of can bodies having a rotation speed changeable as desired while moving continuously.

Figure 2:
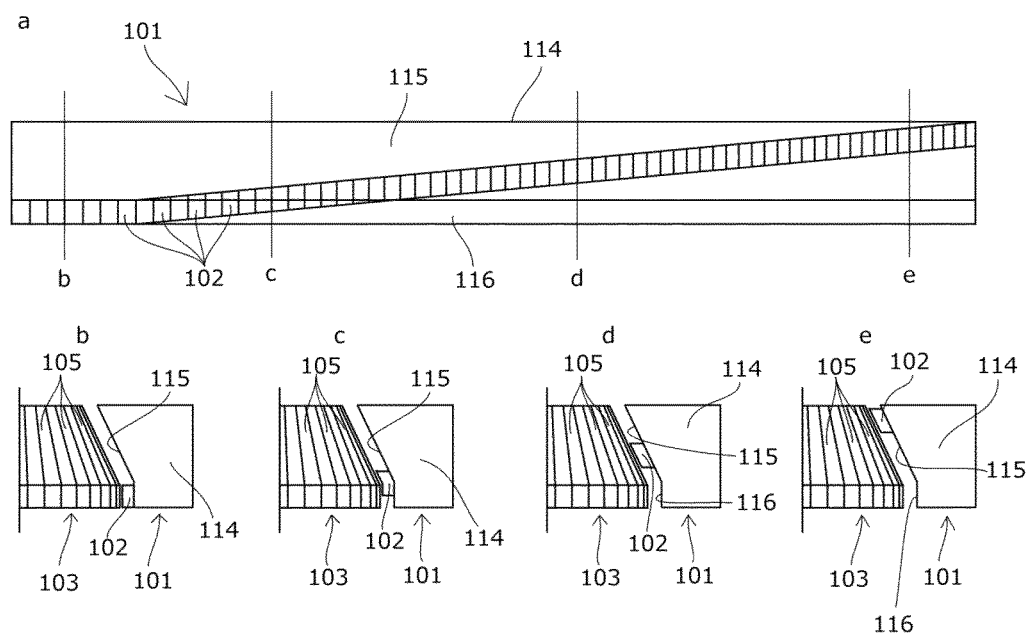
FIG. 2 includes an exploded view of a driving member of the rotationally driving mechanism according to the embodiment of the present invention and diagrams illustrating states where the driving member faces the driven member.

A rotationally driving mechanism according to an embodiment of the present invention is schematically described based on FIG. 1 and FIG. 2.

The rotationally driving mechanism includes: a driving member 101 that is fixed; and a driven member 103 that faces the driving member 101 and is coupled to a rotational shaft 112. The rotational shaft 112 rotates along with the movement of the driven member 103.

The driven member 103 includes a tapered portion 104 and a cylindrical portion 106 as shown in FIG. 1. A plurality of N and S driven magnetic poles 105, as a driven mechanism, are disposed at an equal angular pitch along a circumferential direction of the tapered portion 104 and the cylindrical portion 106. The pitch continuously reduces from a large diameter side to a small diameter side.

As shown in FIG. 2a, in the driving member 101, a plurality of N and S driving magnetic poles 102, as a transmission mechanism, are disposed on an inclined portion 115 and a flat portion 116 of a supporting portion 114 to face an appropriate position of the driven magnetic poles 105 of the driven member 103 in a rotational shaft direction.

A pitch of the driving magnetic poles 102 of the driving member 101 changes along a movement direction of the driven magnetic poles 105. The change is linked with the reduction of the pitch of the driven magnetic poles 105 of the driven member 103 from the large diameter side to the small diameter side. Thus, the pitch of the driving magnetic poles 102 matches the pitch of the driven magnetic poles 105 at an appropriate position where the driving magnetic poles 102 face the driven magnetic poles 105.

The driving magnetic poles 102 of the driving member 101 are oriented in such a direction that attracting force to the driven magnetic poles 105 of the driven member 103 is produced. Furthermore, as shown in FIGS. 2b to 2e, the driving magnetic poles 102 are disposed to face the driven magnetic poles 105 of the driven member 103 adjacently without making contact, that is, with a gap therebetween.

An operation of the rotationally driving mechanism having the configuration described above is described.

For example, when the driven member 103, coupled to the rotational shaft 112, moves from left to right in the figure toward the driving member 101 shown in FIG. 2a, the driven magnetic poles 105 of the driven member 103, coupled to the rotational shaft 112, are driven by the attracting force from the driving magnetic poles 102 of the driving member 101, whereby the rotational shaft 112 rotates.

In the process, the pitch of the driving magnetic poles 102 on the inclined portion 115 and the flat portion 116 of the driving member 101 matches the pitch of the driven magnetic poles 105 of the tapered portion 104 and the cylindrical portion 106 of the driven member 103 at an appropriate position where the driving magnetic poles 102 face the driven magnetic poles 105, as described above. Thus, the driven member 103 is rotationally driven without idling.

The position where the driving magnetic poles 102 of the driving member 101 face the driven magnetic poles 105 of the driven member 103 continuously changes along the rotation and movement directions of the driven magnetic poles 105 (the driven member 103). Thus, the rotation speed of the driven member 103 can be steplessly and thus smoothly changed.

The driving magnetic poles 102 and the driven magnetic poles 105, which are disposed while facing each other with a gap therebetween in the present embodiment, may alternatively be disposed while facing each other and being in contact with each other.

The cylindrical portion 106 and the flat portion 116, respectively provided in the driven member 103 and the driving member 101, may be omitted.

Furthermore, a bevel gear may be provided in the tapered portion 104 of the driven member 103, and an engagement member such as a pin may be disposed on the driving member 101 in a protruding manner. The pitch of the pin changes in accordance with a position where the pin faces the bevel gear. The driven member 103 may be rotationally driven through the engagement between the gear and the pin.

EMBODIMENT

A film label attaching apparatus according to an embodiment of the present invention, employing the rotationally driving mechanism described above, is described.

Figure 3:
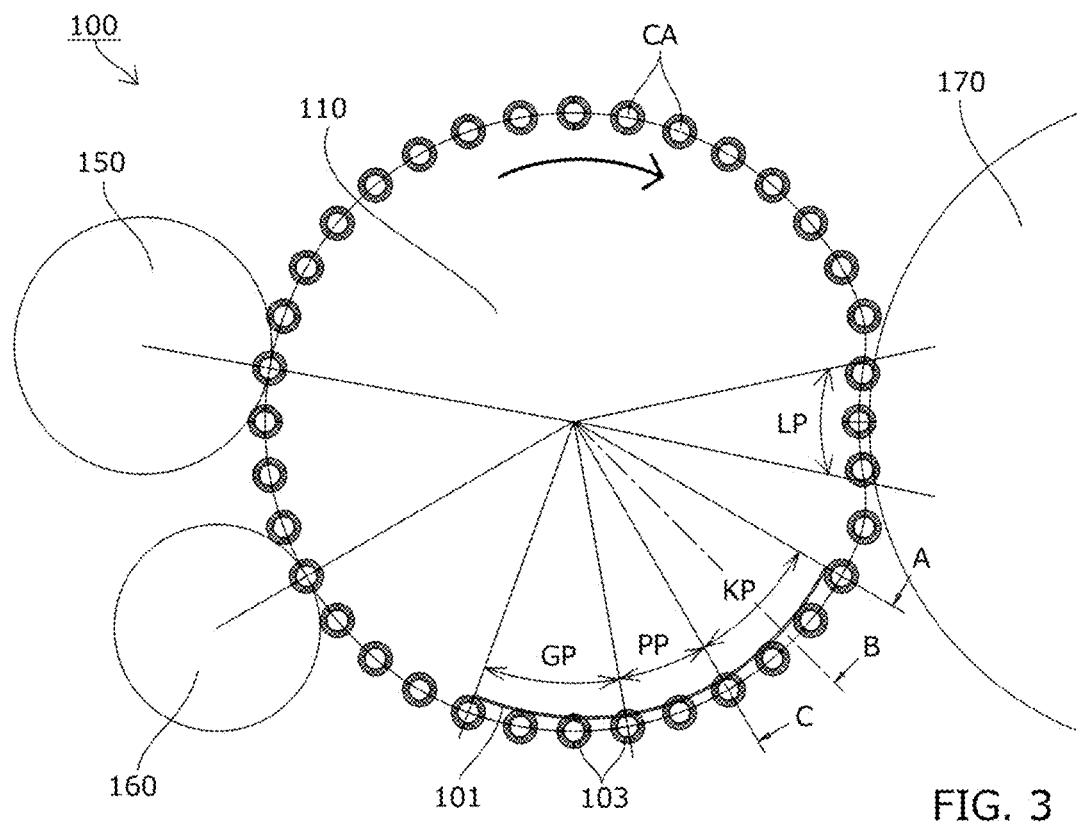
FIG. 3 is a schematic diagram illustrating a film label attaching apparatus according to an embodiment of the present invention.

As schematically shown in FIG. 3, a film label attaching apparatus 100 includes: a main turret 110 provided with a large number of moving bodies 111; a can body supplying wheel 150 that supplies a can body CA to the moving bodies 111 of the main turret 110; a can body discharging wheel 160 that discharges the can body CA from the moving body 111 of the main turret 110; and a film label attaching roller 170 that faces the main turret 110 and attaches a film label onto a surface of the can body CA.

The can body CA supplied from the can body supplying wheel 150 is held by a mandrel 113 (described in detail later) provided in the moving body 111, and appropriately rotates while continuously moving on a revolution track along with the rotation of the main turret 110. A film label is attached on the can body CA in a label attaching section LP, the side surface of the can body CA is pressed to achieve higher adherence of the film label in a re-pressing section PP, and then the can body CA is discharged to the can body discharging wheel 160.

The moving body 111 that holds the can body CA is provided with the driven member 103 for rotating the can body CA. An acceleration section KP, in which the rotation speed of the can body CA is accelerated, and a deceleration section GP, in which the rotation speed of the can body CA is decelerated, are respectively provided before and after the re-pressing section PP.

In the present embodiment, the driving member 101 is disposed over the acceleration section KP, the repressing section PP, and the deceleration section GP while facing the driven members 103, to change the rotation speed along with the movement of the can body CA.

Around the label attaching section LP, the moving body 111 can move on a track along the film label attaching roller 170 (described in detail later). A heating section, in which the can body CA is heated, is provided over an appropriate movement distance before the label attaching section LP.

Known mechanisms are employed for transferring the can bodies CA between the main turret 110 and the can body supplying wheel 150 and the can body discharging wheel 160, and heating the can bodies CA in the heating section.

Figure 4:
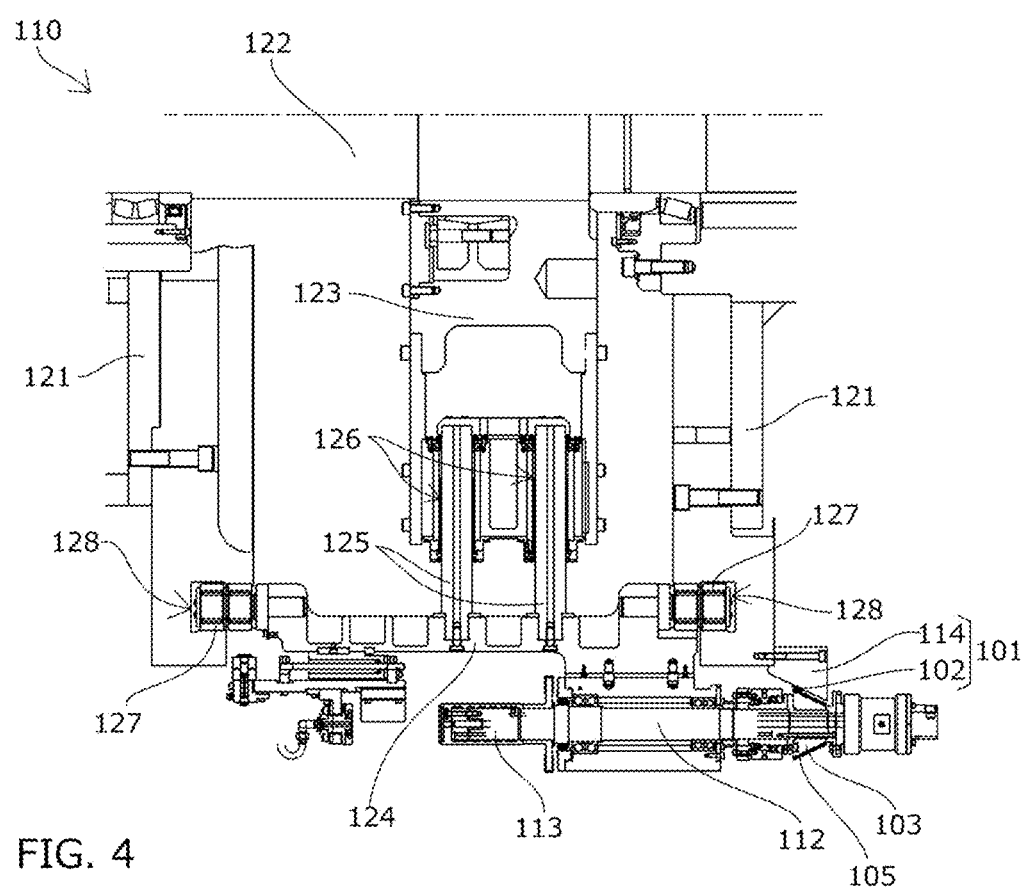
FIG. 4 is a cross-sectional view (showing a starting point of an acceleration section) taken along a direction of an arrow A in FIG. 3.
Figure 5:
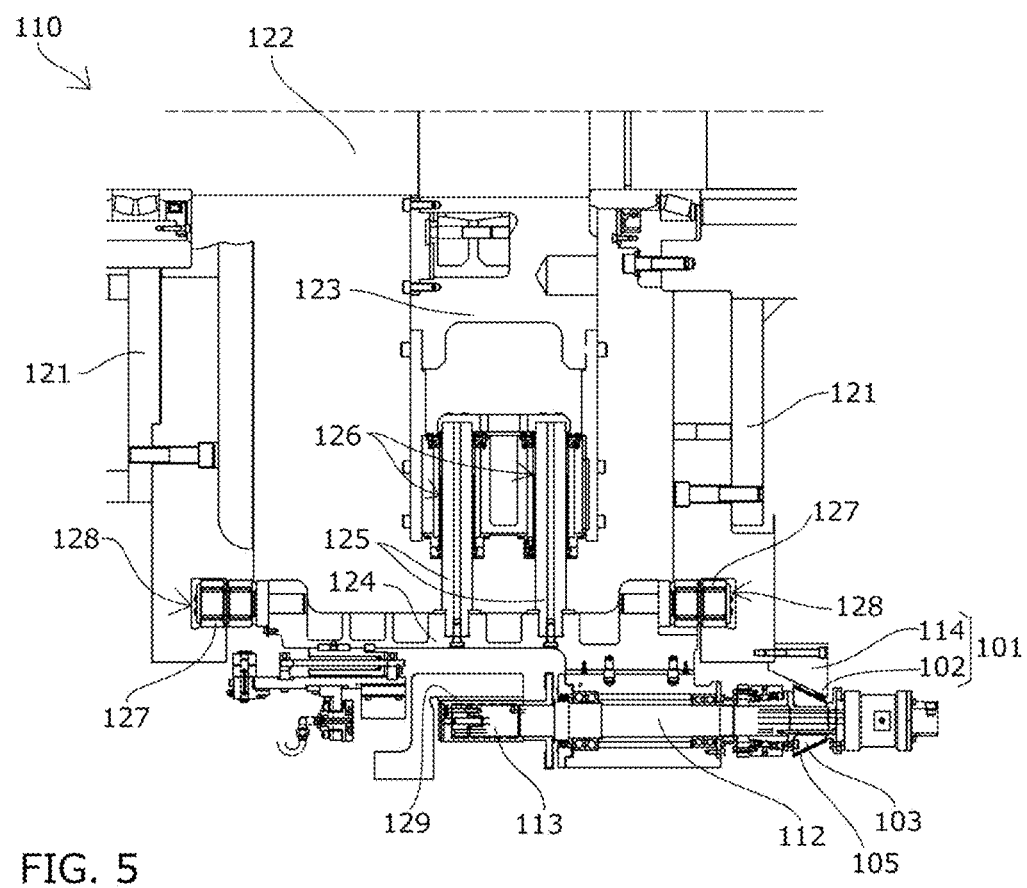
FIG. 5 is a cross-sectional view (showing an end point of the acceleration section: a starting point of a re-pressing section) taken along a direction of an arrow C in FIG. 3.

A specific configuration of the main turret 110 is shown in FIG. 4 and FIG. 5 as views respectively taken in directions of arrows A and C in FIG. 3.

A main shaft 122 of the main turret 110 is rotationally supported by frames 121 that are disposed apart from each other with a predetermined distance therebetween. A rotating body 123 is fixed to the main shaft 122 to integrally rotate with the main shaft 122.

A supporting plate 124 is supported on an outer circumference portion of the rotating body 123 via a pair of supporting pins 125 in such a manner as to be displaceable in a radial direction. The moving body 111 is fixed to the supporting plate 124. The rotational shaft 112, including the mandrel 113 that holds the can body CA, is rotatably supported by the moving body 111.

The supporting pins 125 slidably fit fitting holes 126 radially formed at an equal pitch on the rotating body 123. Cam followers 127 are formed on both ends of the supporting plate 124 in a longitudinal direction, and fit in cam grooves 128 formed on the frames 121 on both sides.

When the rotating body 123 rotates along with the rotation of the main shaft 122, the supporting plate 124, arranged at an equal pitch on the outer circumference of the rotating body 123, rotates while being restricted by the cam grooves 128 and being displaced in the radial direction of the rotating body 123 in accordance with the shape of the cam grooves 128.

In the present embodiment, each of the cam grooves 128 has an endless form, and forms a circle, except for the portion around the label attaching section LP. The moving body 111 fixed to the supporting plate 124 moves on the revolution track.

In the portion around the label attaching section LP, the cam groove 128 is recessed in a radial direction so as to follow the shape of the film label attaching roller 170, whereby a large tracking angle with respect to the film label attaching roller 170 is obtained.

Thus, the label attaching section LP can be formed to have a long length to ensure attaching in a high speed production line.

The supporting plate 124 is supported by a dual cam structure formed by the cam grooves 128 provided on both sides the supporting plate 124. Thus, higher rigidity can be achieved compared with a cantilever supporting structure, whereby a high attaching pressure can be provided. All things considered, the film label can stably adhere, and higher processing speed can be achieved.

The driven member 103 is fixed to an end portion of the rotational shaft 112 rotatably supported by the moving body 111, on the opposite side of the mandrel 113 that holds the can body CA.

The supporting portion 114 for the driving member 101 is fixed to an outer circumferential surface of the frame 121. The driven magnetic poles 105 on the tapered portion 104 of the driven member 103 face the driving magnetic poles 102 of the inclined portion 115 of the driving member 101, whereby the rotationally driving mechanism described above is formed.

When the moving body 111 is moved by the rotation of the main shaft 122 in the section where the driving member 101 is mounted, the driven member 103 is rotationally driven. Thus, the can body CA held by the mandrel 113 moves while rotating.

As illustrated in FIG. 5, in the re-pressing section PP, a pressing pad 129 is disposed on the side of the rotational shaft 112 on which the driving member 101 is disposed. The moving can body CA comes into contact with and then rolls on the pressing pad 129.

In the re-pressing section PP, the pressing pad 129 comes into direct contact with the side surface of the can body CA, and the can body CA rolls on the pressing pad 129 to be rotationally driven. Thus, the rotation speed is defined depending on the diameter of the can body CA.

Generally, the rotation speed, depending on the diameter of the can body CA, is faster than the optimum rotation speed of the can body CA in other processing steps. When the can body CA comes into contact with the pressing pad 129 with a low rotation speed, force is applied to a can cylinder of the can body CA in a circumferential direction and a problem arises in that surface damage or wrinkling of the film label is caused by friction.

Moreover, there is a problem in that, when the optimum rotation speed in the step after the re-pressing section PP is low, a long section is required to decelerate the rotation speed to such a low speed, and in that, when the rotation speed is rapidly decelerated after the re-pressing section PP, a large load is imposed on the clutch and the like.

Thus, in the present embodiment, the acceleration section KP and the deceleration section GP are respectively disposed right before and right after the re-pressing section PP, and the driving member 101 is disposed over the acceleration section KP, the deceleration section GP, and the re-pressing section PP to face the driven members 103, to form the rotationally driving mechanism described above. The rotationally driving mechanism actively changes the rotation speed along with the movement of the can body CA in a short section, thereby solving the problems described above.

As shown in FIG. 3, the acceleration section KP starts at a position where the movement path of the moving body 111 returns to the revolution track, right after the label attaching section LP.

Figure 6:
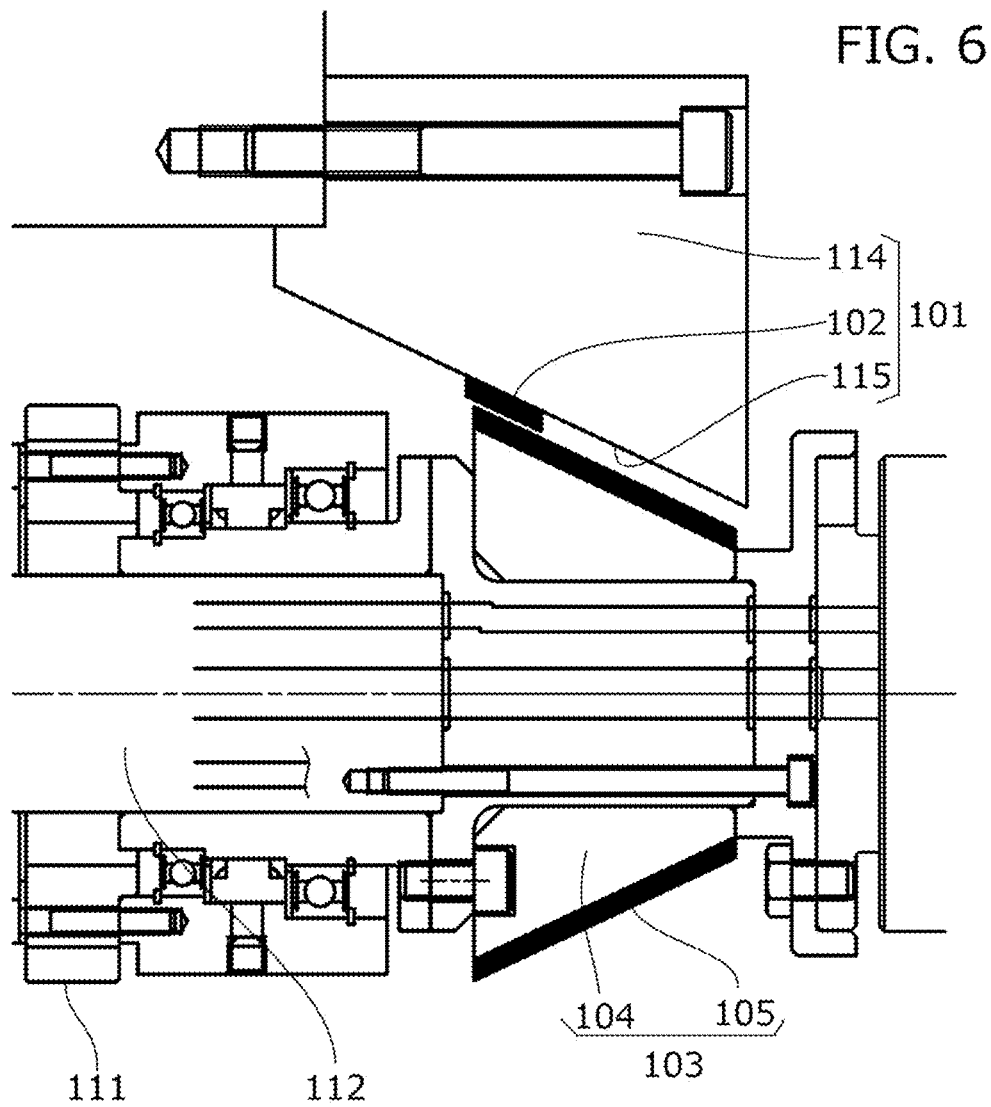
FIG. 6 is an enlarged view of the rotationally driving mechanism (at the starting point of the acceleration section) taken along the direction of the arrow A in FIG. 3.

As shown in FIG. 6, at the starting position of the acceleration section KP, the driving magnetic pole 102, on the inclined portion 115 of the driving member 101, faces a position where the driven magnetic pole 105, on the tapered portion 104 of the driven member 103, has the largest diameter.

Figure 7:
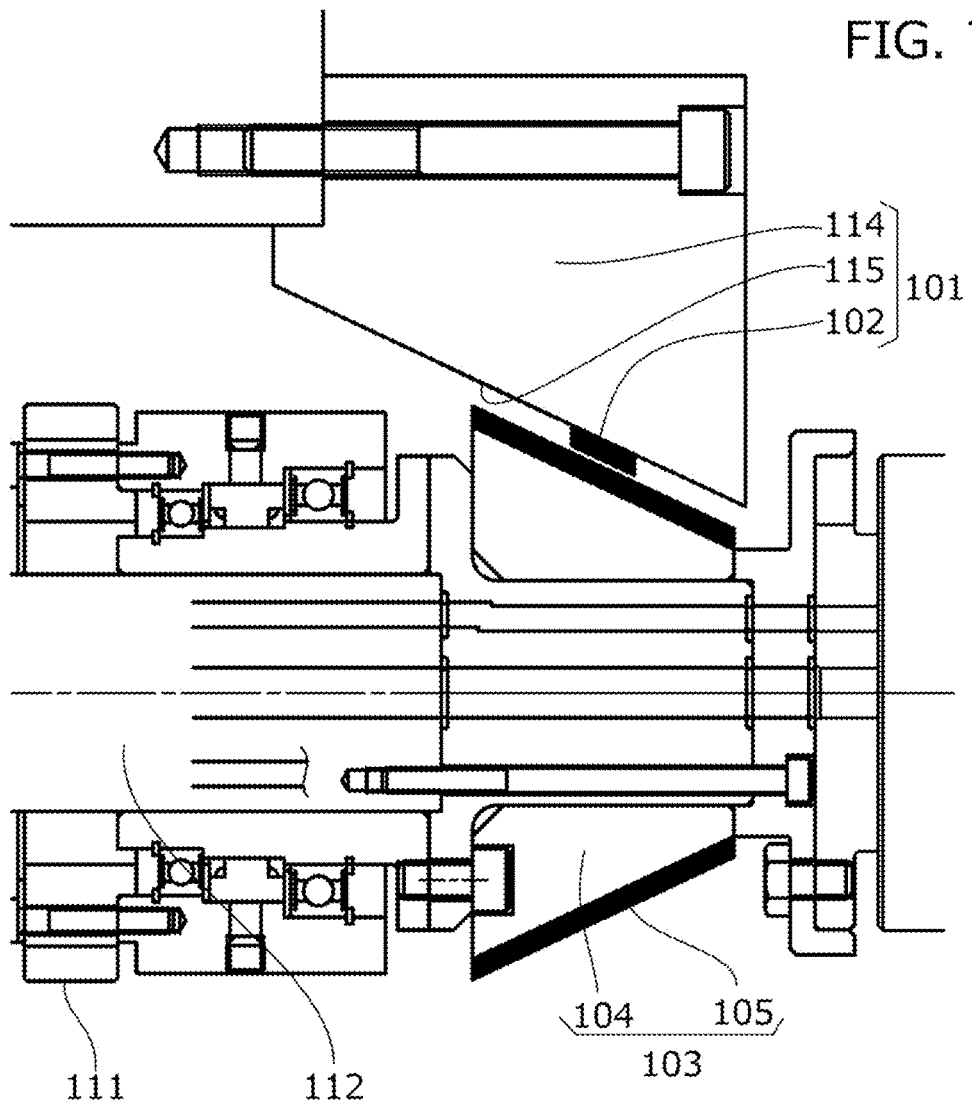
FIG. 7 is an enlarged view of the rotationally driving mechanism (at an intermediate point of the acceleration section) taken along a direction of an arrow B in FIG. 3.
Figure 8:
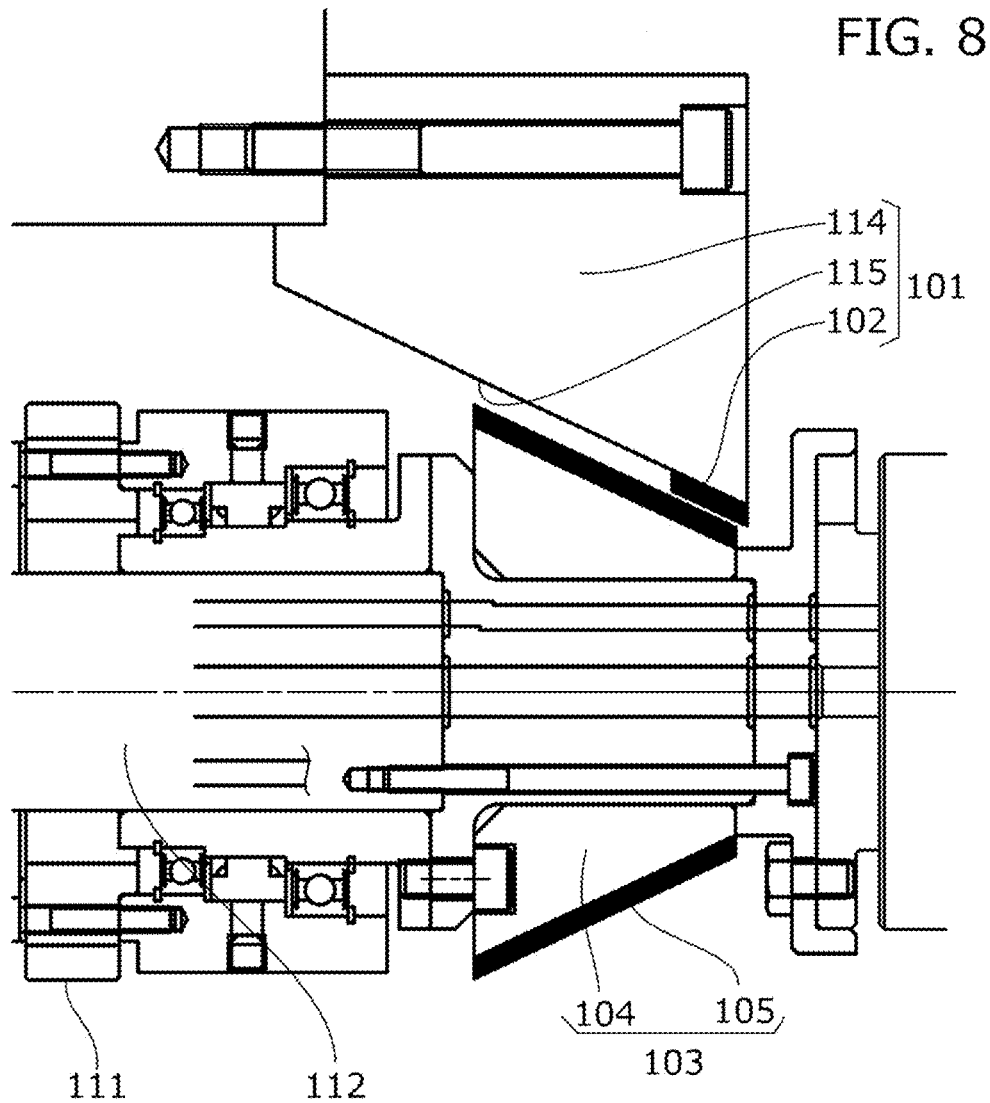
FIG. 8 is an enlarged view of the rotationally driving mechanism (at the end point of the acceleration section: the starting point of the re-pressing section) taken along a direction of an arrow C in FIG. 3.

Then, the position where the driving magnetic poles 102 of the driving member 101 face the driven magnetic poles 105 of the driven member 103 gradually moves to a smaller-diameter position along with the movement of the can body CA and passes through an intermediate position shown in FIG. 7. Consequently, as shown in FIG. 8, at the starting position of the re-pressing section PP, i.e., the end position of the acceleration section KP, the driving magnetic pole 102 on the inclined portion 115 of the driving member 101 faces the driven magnetic pole 105 on the tapered portion 104 of the driven member 103 at a position where the diameter of the driven magnetic pole 105 is equal to that of the can body CA.

With the configuration described above, the can body CA has the rotation speed accelerated up to that obtained by being in direct contact with the pressing pad 129, while moving through the acceleration section KP. Thus, the can body CA comes into contact with the pressing pad 129 with no rotation speed difference, whereby the attached film label is free of the surface damage or wrinkling due to friction.

In the deceleration section GP, starting from the end position of the re-pressing section PP, the driving magnetic pole 102 on the inclined portion 115 of the driving member 101 gradually moves in the direction opposite to that in the case described above, as the can body CA moves, so that the position where the driving magnetic poles 102 face the driven magnetic poles 105 moves to a position where the diameter of the driven magnetic pole 105 on the tapered portion 104 of the driven member 103 is large to decelerate the rotation speed of the can body CA. Thus, processing in the subsequent step can be immediately performed after the short deceleration section GP.

In the present embodiment, the driving member 101 is disposed over the acceleration section KP, the re-pressing section PP, and the deceleration section GP only. Alternatively, when the can bodies CA need to be rotationally driven and have the rotation speed changed actively also in other sections, the driving member 101 may be intermittently disposed in these sections or may be continuously disposed to include these sections.

The present embodiment employs the driven member 103 provided with a cylindrical portion 106 with a radius corresponding to the rotation speed so that driving force is more surely transmitted with the cylindrical portion 106, but in a case where, for example, a section in which the can bodies CA are driven at a constant rotation speed is short, the driven member 103 including the tapered portion 104 may be employed.

The driven member 103 may be coupled to the rotational shaft 112 with a one way clutch provided therebetween, so that while the driving by the rotationally driving mechanism is being performed, other mechanisms can rotationally drive the can bodies CA at a high speed.

With this configuration, for example, the other mechanisms only need to provide driving force required for acceleration to offset the difference from the rotation speed obtained by the rotationally driving mechanism. Thus, the damage and the load on the can bodies CA and the other mechanisms by this driving force can be reduced.

INDUSTRIAL APPLICABILITY

The rotationally driving mechanism of the present invention is suitably applied to the film label attaching apparatus of the present invention described above and other devices that process cylindrical containers such as can bodies. However, this should not be construed in a limiting sense, and the present invention may be employed in various industrial fields.

The invention claimed is:

1. A rotationally driving mechanism comprising:
a movable driven member that is coupled to a rotational shaft and is movable in a direction orthogonal to the rotational shaft; and
a driving member, wherein the driven member includes a tapered portion in which a driven mechanism is disposed, wherein
the driving member is fixedly disposed along a movement direction of the driven member,
the driving member includes an inclined portion which faces the tapered portion and in which a transmission mechanism is disposed,
the transmission mechanism is disposed to face a predetermined position of the driven mechanism in a rotational shaft direction, in accordance with a rotation speed required for a predetermined position of the driven member, and
a position where the transmission mechanism of the driving member faces the driven mechanism of the driven member continuously changes along the movement direction of the driven member.

2. The rotationally driving mechanism according to claim 1, wherein the driven mechanism and the transmission mechanism face each other with a gap therebetween.

3. The rotationally driving mechanism according to claim 1, wherein
the driven mechanism is formed of a plurality of driven magnetic poles and the transmission mechanism is formed of a plurality of driving magnetic poles, and
the driven magnetic poles are disposed at an equal angular pitch that continuously reduces from a large diameter side to a small diameter side, and a pitch of the driving magnetic poles is set to match the pitch of the driven magnetic poles at an appropriate position where the driving magnetic poles face the driven magnetic poles.

4. The rotationally driving mechanism according to claim 1, wherein the driving member is disposed at least at a position where a rotation speed of the rotational shaft of the driven member is changed.

5. A film label attaching apparatus that rotates a plurality of can bodies while continuously moving the can bodies and attaches film labels on outer circumferential surfaces of the plurality of can bodies, wherein
the can bodies are each continuously moved while being rotated by the rotational shaft of the driven member of the rotationally driving mechanism according to claim 1.

6. The film label attaching apparatus according to claim 5, wherein the transmission mechanism of the driving member is disposed at least between a label attaching section and a re-pressing section in a movement direction of the can bodies, in such a manner that the rotation speed of the rotational shaft changes along the movement direction of the can bodies.

7. The film label attaching apparatus according to claim 6, wherein
a pressing pad on which the can bodies contact and roll while moving is disposed in the re-pressing section, and
the pressing pad is disposed on a side of the rotational shaft of the driven member where the driving member is disposed.

8. The film label attaching apparatus according to claim 5, wherein the driving member is continuously disposed over all sections in the movement direction of the can bodies.

* * * * *